(12) United States Patent
Huang et al.

(10) Patent No.: US 7,557,798 B2
(45) Date of Patent: Jul. 7, 2009

(54) WIRELESS INPUT DEVICE

(75) Inventors: Chun-Chung Huang, Taipei (TW); Chien-Tsung Chen, Taoyuan (TW)

(73) Assignee: Darfon Electronics Corporation, Taoyuan (TW)

( * ) Notice: Subject to any disclaimer, the term of this patent is extended or adjusted under 35 U.S.C. 154(b) by 826 days.

(21) Appl. No.: 11/022,173

(22) Filed: Dec. 23, 2004

(65) Prior Publication Data
US 2005/0146504 A1 Jul. 7, 2005

(30) Foreign Application Priority Data

Jan. 6, 2004 (TW) .............. 93200173 U
Apr. 15, 2004 (TW) .............. 93110577 A
Jun. 3, 2004 (TW) .............. 93208781 U (51) Int. Cl.
*G09G 5/08* (2006.01)
(52) U.S. Cl. .................. 345/163; 345/164; 345/165; 345/166
(58) Field of Classification Search .......... 345/163–166
See application file for complete search history.

(56) References Cited

U.S. PATENT DOCUMENTS

| | | | |
|---|---|---|---|
| 6,225,981 B1 | 5/2001 | Lu | |
| 6,304,249 B1 | 10/2001 | Derocher et al. | |
| 7,187,361 B2 * | 3/2007 | Wang | 345/163 |
| 2002/0002061 A1 | 1/2002 | Miyasaka et al. | |
| 2002/0024502 A1 | 2/2002 | Iwasaki | |
| 2002/0140678 A1 | 10/2002 | Kawashima et al. | |
| 2002/0190952 A1 | 12/2002 | Shah | |
| 2003/0179177 A1 | 9/2003 | Wang | |
| 2003/0217205 A1 | 11/2003 | Chen et al. | |
| 2005/0012719 A1 * | 1/2005 | Su | 345/163 |
| 2005/0073499 A1 | 4/2005 | Wang | |
| 2007/0226378 A1 * | 9/2007 | O'Keefe et al. | 710/8 |

FOREIGN PATENT DOCUMENTS

| | | |
|---|---|---|
| CN | 1241744 A | 1/2000 |
| CN | 2520524 Y | 11/2002 |
| CN | 2588444 Y | 11/2002 |

(Continued)

OTHER PUBLICATIONS

European Search Report dated Sep. 13, 2007.

*Primary Examiner*—Richard Hjerpe
*Assistant Examiner*—Leonid Shapiro
(74) *Attorney, Agent, or Firm*—Snell & Wilmer L.L.P.

(57) ABSTRACT

A first wireless input device includes a body, a case, a structure and a button. The button, connected to the body, activates the structure to make the case detach from the body when being depressed so that an electronic device stored in the first wireless input device is capable of being removed. A second wireless input device includes a body, a first structure and a button. The button, connected to the body, activates the first structure to separate the body and an electronic device stored in the second wireless input device when being depressed so that the electronic device is capable of being removed. A third wireless input device includes a body and a case. When the case and the body are connected together, a receiver stored in the third wireless input device is capable of being removed through an opening and a gap. When the case detaches from the body, a battery is capable of being replaced.

21 Claims, 9 Drawing Sheets

FOREIGN PATENT DOCUMENTS

| | | |
|---|---|---|
| CN | 2537046 Y | 2/2003 |
| CN | 2560033 Y | 7/2003 |
| CN | 2636323 Y | 8/2004 |
| DE | 20210736 U1 | 10/2002 |
| DE | 20310782 U1 | 12/2003 |
| DE | 20315622 U1 | 12/2003 |
| HK | 04134 | 8/2004 |
| JP | 2-14537 | 12/1990 |
| JP | 8289342 | 11/1996 |
| JP | 11-136326 | 5/1999 |
| JP | 2001100912 | 4/2001 |
| JP | 2001337741 | 12/2001 |
| JP | 2002-091698 | 3/2002 |
| JP | 3090068 | 9/2002 |
| JP | 2002287899 | 10/2002 |
| JP | 2003084873 | 3/2003 |
| JP | 2003122449 | 4/2003 |
| TW | 545648 Y | 8/2003 |
| TW | 555094 Y | 9/2003 |
| TW | 560653 Y | 11/2003 |
| TW | 560653 Y | 11/2003 |
| TW | 590265 Y | 6/2004 |
| TW | 245528 Y | 10/2004 |
| TW | 246717 Y | 10/2004 |
| TW | 251211 Y | 11/2004 |
| TW | 253006 Y | 12/2004 |

\* cited by examiner

WIRELESS INPUT DEVICE

This Application claims priority to Taiwan Patent Application No. 093200173 filed on Jan. 6, 2004, Taiwan Patent Application No. 093110577 filed on Apr. 15, 2004, and Taiwan Patent Application No. 093208781 filed on Jun. 3, 2004.

FIELD OF INVENTION

The present invention relates to wireless computer peripherals and, more particularly, relates to wireless computer input devices.

BACKGROUND OF THE INVENTION

Figure 1A:
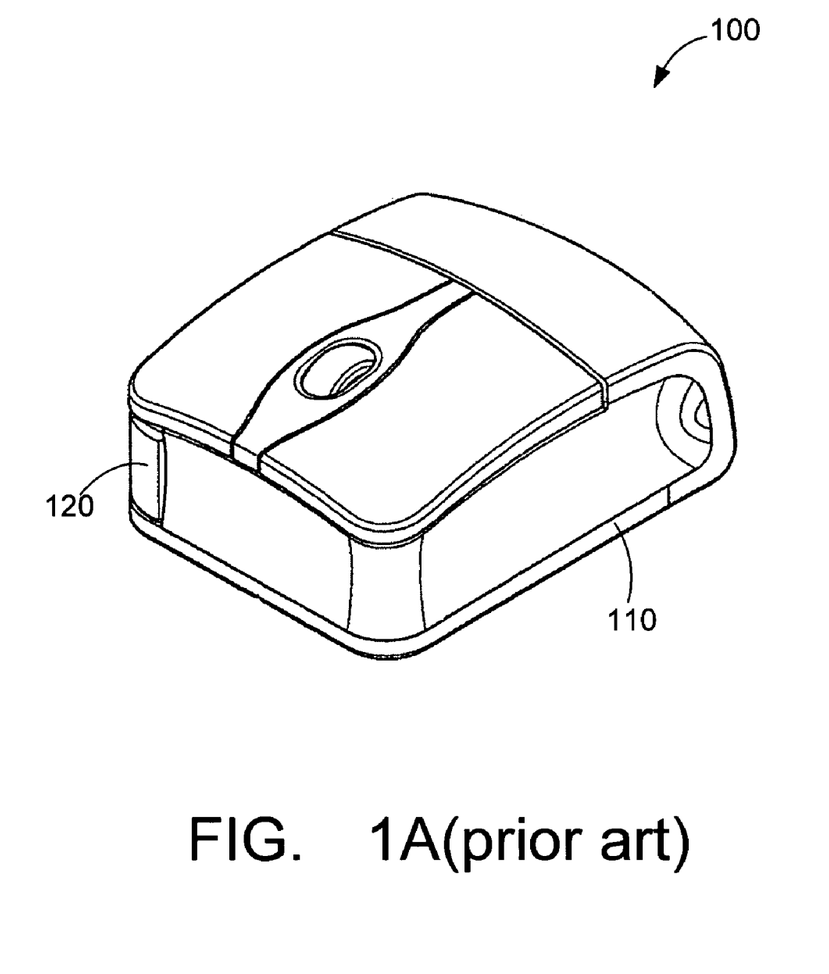
FIGS. 1A and 1B illustrate a cordless mouse of the prior art.
Figure 1B:
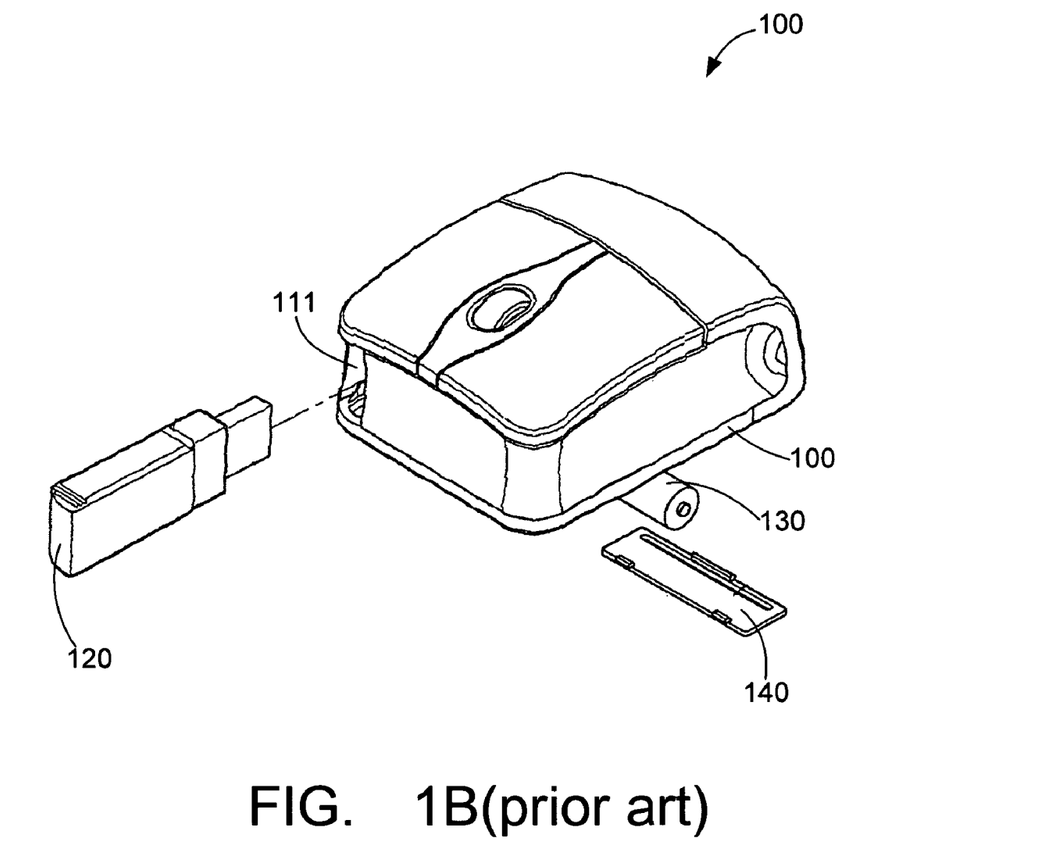

Most computers in the current market require at least one peripheral for users to input commands. With the progress of technology, these peripherals, such as mice, keyboards and touch pads, are able to transmit signals to computers through wireless communications. FIGS. 1A and 1B show a cordless mouse of the prior art. The mouse 100 includes a body 110 which has a space 111 for receiving a receiver 120. The receiver 120 when being connected to a USB port of a computer is adapted to receive signals sent by the body 110. When the receiver 120 is removed from the space 111 and connected to a computer, the space 111 would be exposed. One of the drawbacks is that such exposure of the space 111 may cause incursion of dust and fluid, which might damage the circuits in the body 110. The lifetime of mouse 100 hence shortens.

The mouse 100 further includes a room for accommodating a battery 130 and a cover 140 for covering the room. The room is usually provided on the bottom of the body 110. Another drawback is that a user must turn the mouse 100 over if he/she wants to change the battery 130. The arrangement is inconvenient while the battery 130 is replaced.

SUMMARY OF THE INVENTION

To overcome the above-mentioned drawbacks, the present invention provides wireless input devices with effective and convenient space arrangement.

One wireless input device of the present invention includes a body, a case, a structure and a button. The body has a first space for receiving an electronic device which includes a receiver for receiving the signals transmitted from the wireless input device when the receiver is connected to a computer. The case separably covers on the body and the first space. The structure is configured to separably connect the body and the case. The button, connected to the body, activates the structure to make the case detach from the body when being depressed so that the electronic device is capable of being removed from the first space.

The structure includes an elastic board, a protrusion and a clasper. The elastic board is connected to the body. The protrusion is disposed on the elastic board. The clasper, disposed on the case, is configured to couple to the protrusion. When being depressed, the button pushes the elastic board so the clasper and the protrusion are decoupled from each other. The case, therefore, may detach from the body.

Another wireless input device of the present invention includes a body, a first structure and a button. The body has a first space for receiving an electronic device. Similarly, the electronic device includes a receiver for receiving the signals transmitted from the wireless input device when the receiver is connected to a computer. The first structure is configured to separably connect the body and the electronic device. The button, connected to the body, activates the first structure to separate the body and the electronic device when being depressed so that the electronic device is capable of being removed from the first space.

The first structure includes at least one pit and one first protrusion corresponding to the pit. The pit is disposed on the electronic device and the first protrusion is disposed on the body. When the electronic device is received in the first space, the first protrusion is lodged in the pit.

Another wireless input device of the present invention includes a body and a case. The body further includes a tube and a first space. The tube has an opening and is configured to receive a receiver. The first space, disposed at a side of the tube, is configured to receive a first battery. The case, separably connected to the body, covers the first space and has a gap corresponding to the opening. When the case and the body are connected together, the receiver is capable of being removed out through the opening and the gap. When the case detaches from the body, the first battery is capable of being removed from the first space.

DETAILED DESCRIPTION

Figure 2A:
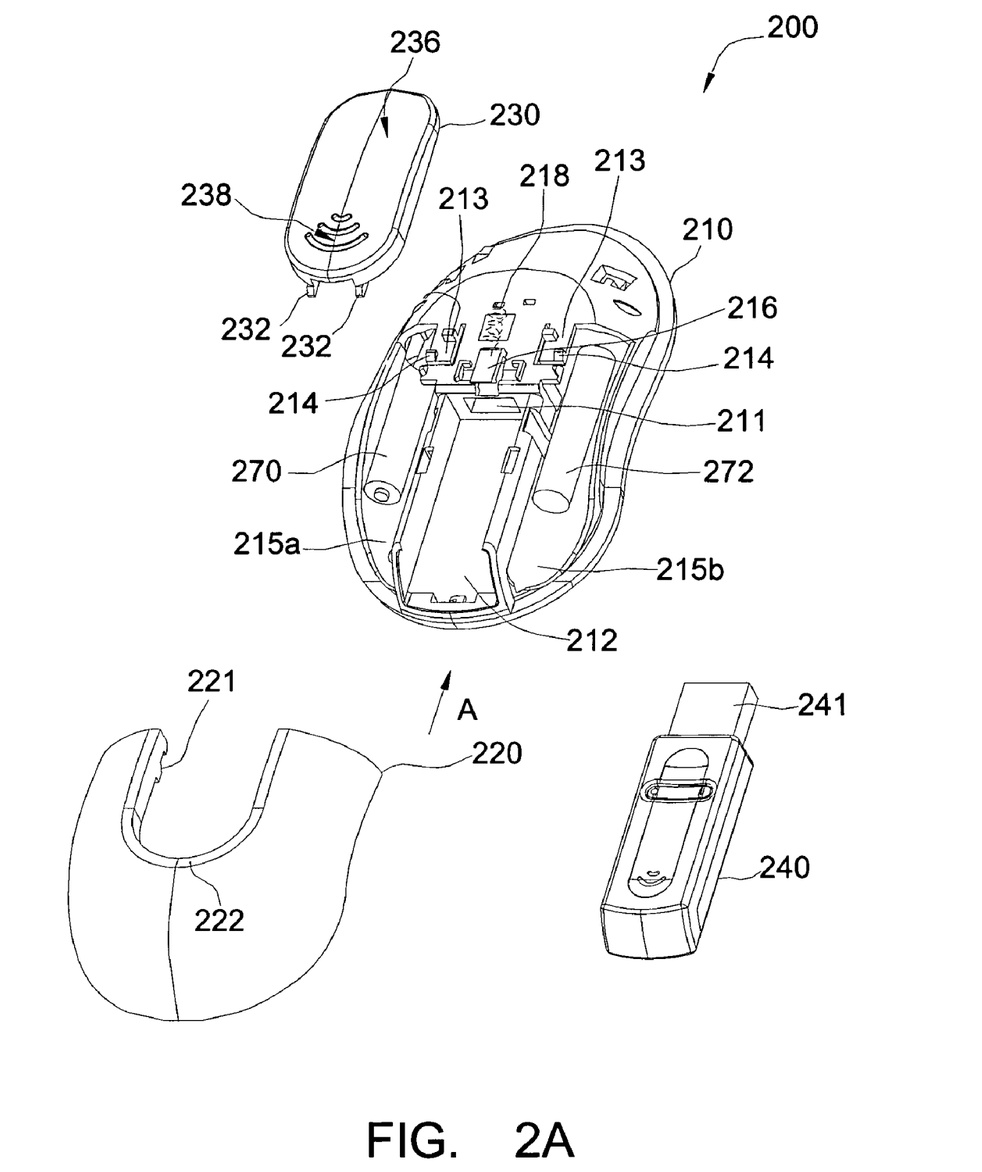
FIG. 2A illustrates an explosive view of a first embodiment of the present invention.
Figure 2B:
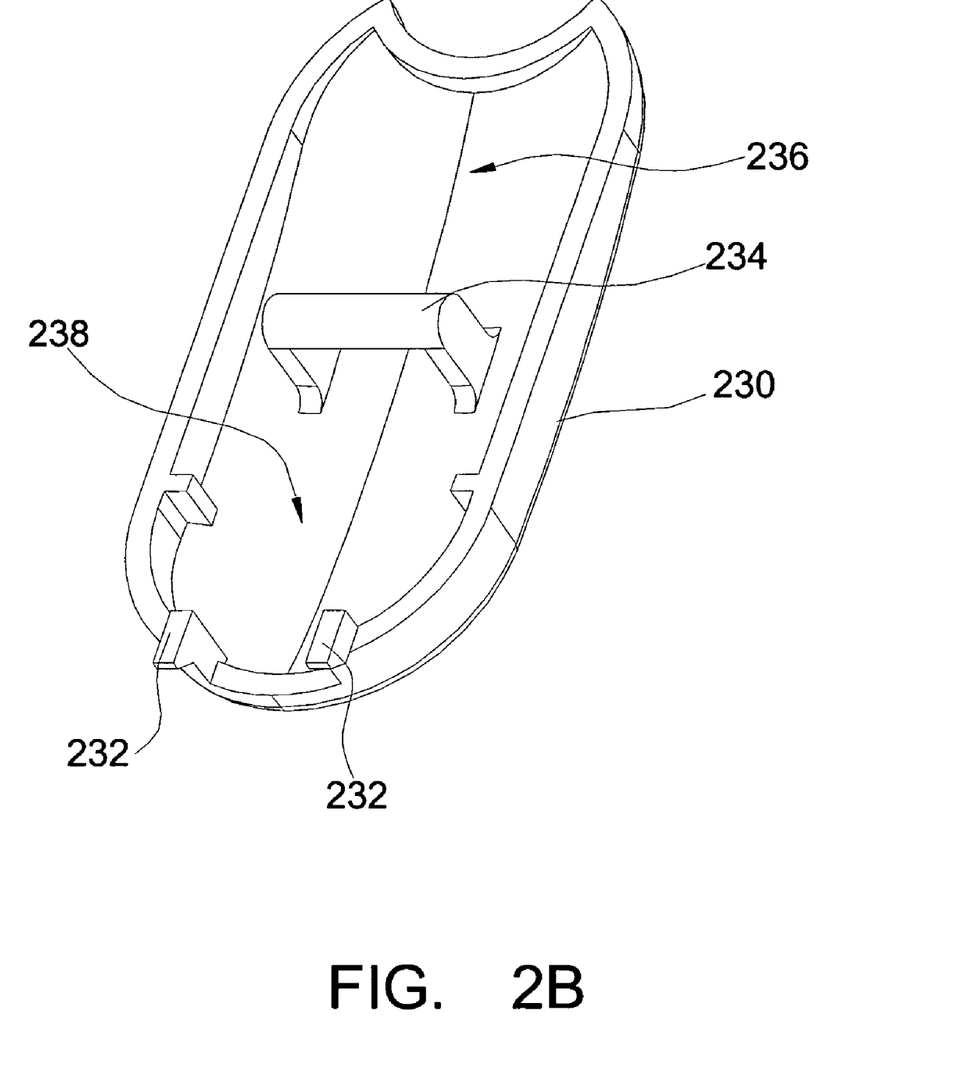
FIG. 2B illustrates a bottom view of a button of the first embodiment.
Figure 2C:
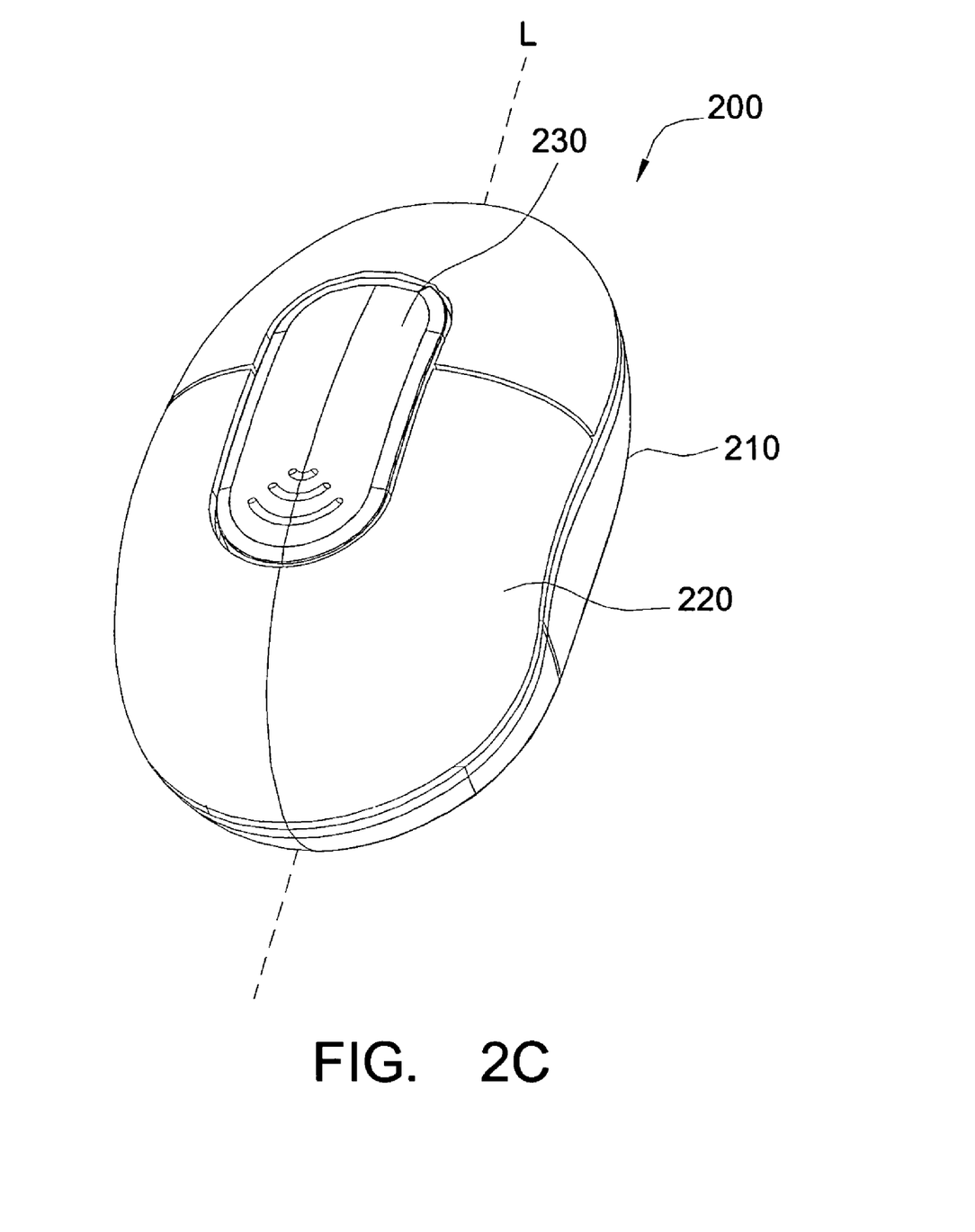
FIG. 2C illustrates the first embodiment of the present invention.

FIGS. 2A and 2C show a first embodiment of the wireless input device. The first embodiment is a wireless mouse 200 including a body 210, a case 220, a button 230, and two structures which respectively include an elastic board 213, a protrusion 214, and a clasper 221. The body 210 includes some circuits, such as a shift sensor (not shown), a processor (not shown) and a signal transmitter (not shown), for executing typical mouse functions. The body 210 further includes a first space 212 for receiving an electronic device 240. The electronic device 240 is a receiver capable of being connected to a computer for receiving signals from the body 210. The case 220, having a substantial U-shape, separably covers on the body 210 and the first space 212. The structures (the detailed descriptions are set forth below) are configured to separably connect the body 210 and the case 220. The button 230, disposed at an indentation of the case 220, is connected to a connection element 216 of the body 210. When being depressed, the button 230 activates the structures so that the case 220 may detach from the body 210, and the electronic device 240 is capable of being removed from the first space 212.

The elastic board 213 is disposed on the body 210 and the protrusion 214 is disposed on the elastic board 213. The clasper 221, disposed on the case 220, is configured to couple to the protrusion 214. When being depressed, the button 230 bends the elastic board 213 downwards to separate the clasper 221 from the protrusion 214 so that the case 220 may detach from the body 210.

Furthermore, the button 230 includes a first end 236, a second end 238 and two blocks 232 disposed below the second end 238. When being depressed, the first end 236 activates the structures and, at the same time, the blocks 232 push a rim 222 of the case 220. Therefore, the case 220 can detach from the body 210.

When attaching the case 220 to the body 210, a user may push the case 220 in the direction A as FIG. 2A shows. At the time the case 220 approaches the body 210, the clasper 221 couples to the protrusion 214. The case 220 thereby attaches to the body 210 firmly.

FIG. 2B shows a bottom view of the button 230. As FIG. 2B shows, the button 230 includes a shaft 234 between the first end 236 and the second end 238. The shaft 234 is adapted to connect to the connection element 216 of the body 210 so the button 230 can move like a seesaw. Accordingly, when the first end 236, or the second end 238, is depressed, the second end 238, or the first end 236, will move upwards.

Referring back to FIG. 2A, the electronic device 240 includes a connector 241, located at an end of the electronic device 240, which is a USB joint for connecting to a USB port of a computer. The body 210 has a positioning space 211 linking to the first space 212. When receiving the electronic device 240, a user may push the electronic device 240 in the direction A. The positioning space 211 would receive the connector 241 so that the electronic device 240 is positioned in the first space 212.

The mouse 200 further includes an elastic element 218. A part of the elastic element 218 extends to the positioning space 211. When the electronic device 240 is received in the first space 212, the elastic element 218 touches the connector 241 and provides an elastic force on the electronic device 240 to stabilize the electronic device 240 in the first space 212.

To facilitate the replacement of battery, the body 210 further includes a second space 215a and a third space 215b, provided at two sides of the first space 212 respectively, for receiving a first battery 270 and a second battery 272. The first space 212, the second space 215a and the third space 215b are parallel to a longitudinal line L of the mouse 200. The first battery 270 and the second battery 272 are adapted to provide power for the mouse 200. The case 220 further includes a metal piece (not shown) for connecting the first battery 270 and the second battery 272 in series. When the case 220 detaches from the body 210, the first battery 270 and the second battery 272 can be replaced. The mouse 200 does not have to be turned over for battery replacement purposes.

Although the electronic device 240 is a receiver, the present invention does not limit the purpose of the electronic device 240 to receiving signals. For example, the electronic device 240 may further includes a data storage device, such as a flash memory, for storing data. The connector 241 can be used not only to transmit signals from the mouse 200 to a computer but also to access data in the flash memory of the electronic device 240.

Figure 3:
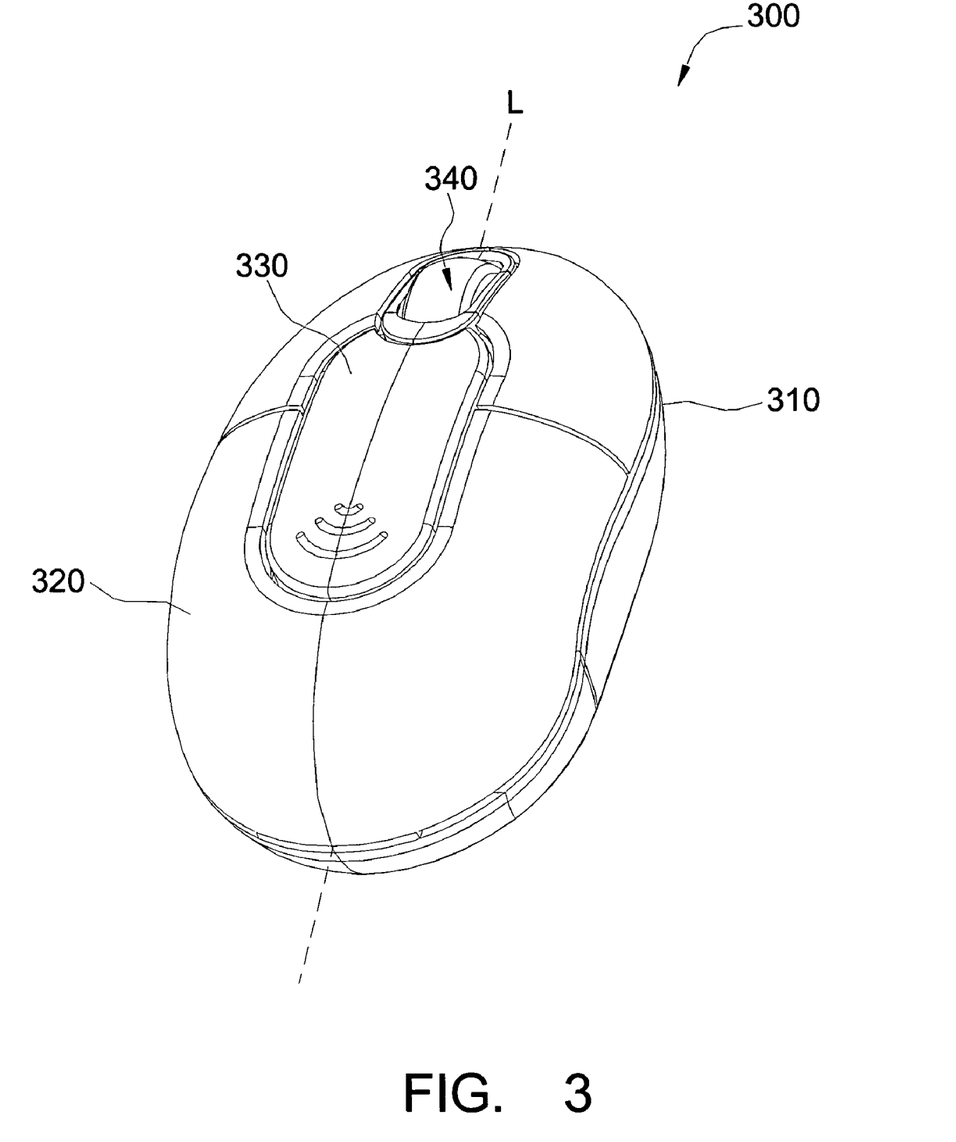
FIG. 3 illustrates a second embodiment of the present invention.

FIG. 3 shows a second embodiment of the wireless input device. The second embodiment is a wireless mouse 300 including a body 310, two structures (not shown), a case 320 and a button 330. The functions and the structures of these elements are similar to those of the mouse 200. One difference from the mouse 200 is that the mouse 300 includes a roller 340 for scrolling displays shown on a monitor. The roller 340 is disposed at the front end of the mouse 300 for a user to facilitate scrolling by a finger. The button 330 is disposed between the case 320 and the roller 340. The roller 340 and the button 330 are arranged along a longitudinal line L of the mouse 300.

Figure 4A:
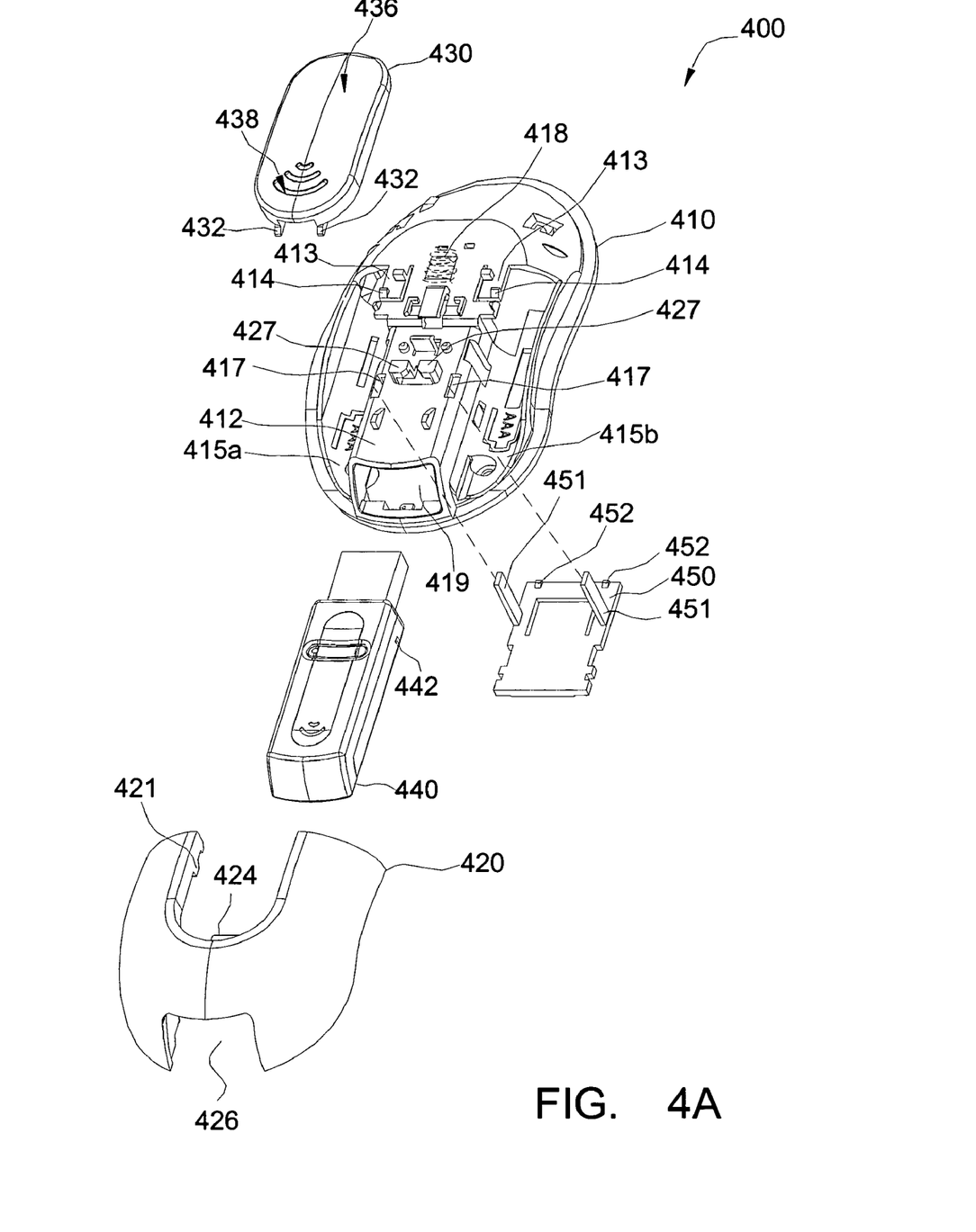
FIG. 4A illustrates an explosive view of a third embodiment of the present invention.

FIG. 4A shows a third embodiment of the wireless input device. The third embodiment is a wireless mouse 400. The mouse 400 includes a body 410, a first structure and a button 430. The body 410 has a first space 412 for receiving a receiver 440, wherein the first space 412 is formed by a tube as shown. The tube has an opening 419. The first structure is configured to separably connect the body 410 and the receiver 440. The detailed descriptions of the first structure are set forth below. The button 430 is connected to the body 410 and has a first end 436 and a second end 438. When the second end 438 is depressed, the button 430 activates the first structure in order to separate the body 410 from the receiver 440. Therefore, the receiver 440 is capable of being removed from the first space 412.

The mouse 400 further includes a case 420, having a U-shape, separably covering on the body 410. The case 420 further has a gap 426 corresponding to the opening 419. When a user would like to take out or insert the receiver 440, the receiver 440 would pass through the opening 419 and the gap 426.

Figure 4B:
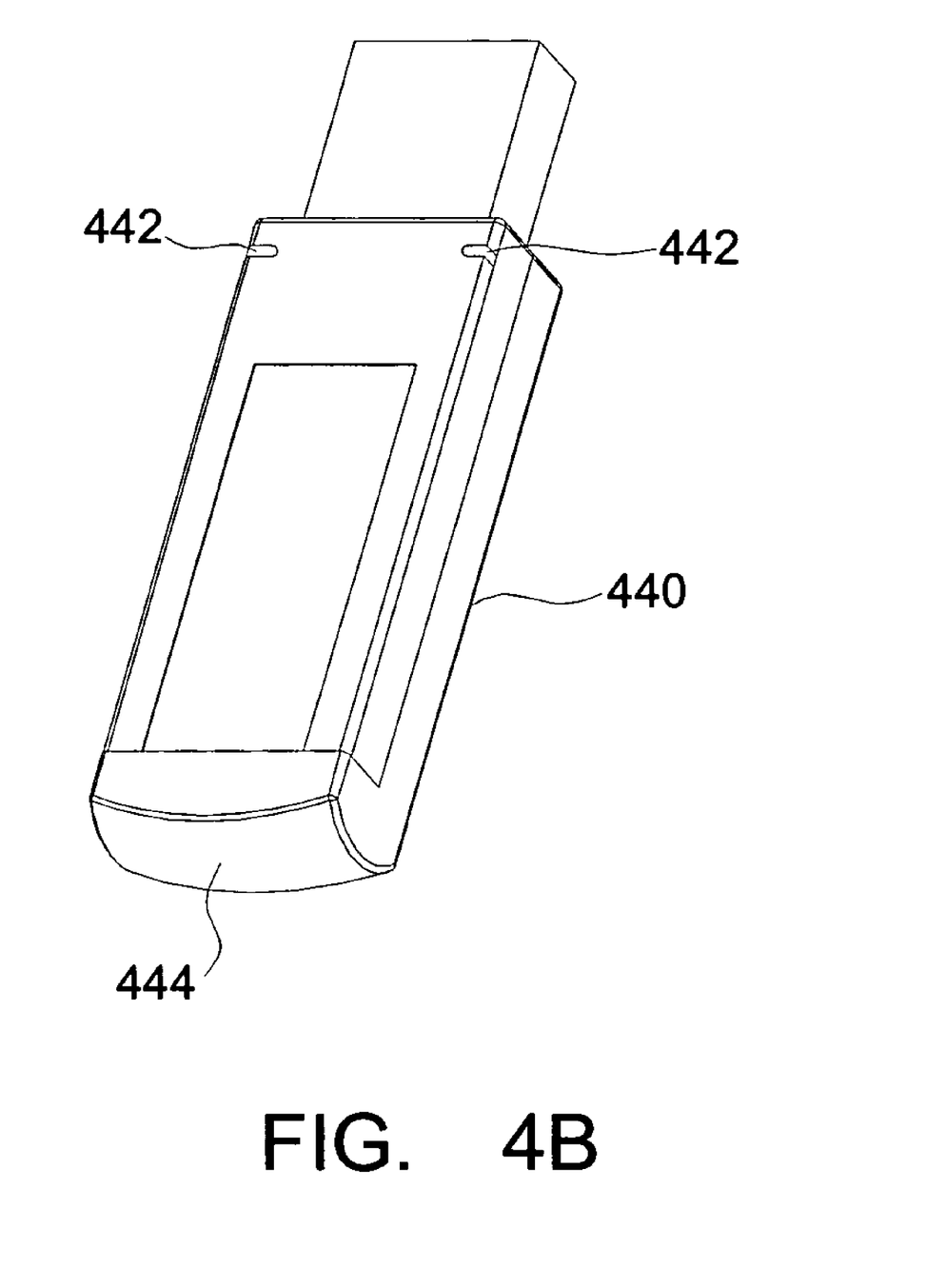
FIG. 4B illustrates a bottom view of an electronic device of the third embodiment.

FIG. 4B shows a bottom view of the receiver 440. Referring to FIGS. 4A and 4B, the first structure includes two pits 442 and two first protrusion 452. The pits 442 are disposed on the receiver 440 and the first protrusions 452 correspond to the pits 442. When the receiver 440 is received in the first space 412, the first protrusions 452 are lodged in the pits 442. The first structure further includes an elastic piece 450 disposed on the body 410. The first protrusions 452 are disposed on the elastic piece 450. When the second end 438 is depressed, the elastic piece 450 is pushed so that the first protrusions 452 depart from the pits 442. More particularly, the elastic piece 450 includes two pillars 451 which contact the bottom of button 430 through two holes 417. When the second end 438 is depressed, the button 430 activates the pillars 451, the pillars 451 bend the elastic piece 450 downwards and then the first protrusions 452 depart from the pits 442.

The body 410 further includes two first coupling elements 427, and the case 420 further includes a second coupling element 424. When the case 420 attaches to the body 410, the first coupling elements 427 and the second coupling element 424 would couple together to improve the firmness of the attachment.

The mouse 400 further includes two second structures for separably connecting the body 410 and the case 420. Each of the second structures includes an elastic board 413, a second protrusion 414 and a clasper 421, wherein the structure and function of the elastic board 413 are similar to those of the elastic board 213 of the first embodiment, the structure and function of the second protrusion 414 are similar to those of the protrusion 214 of the first embodiment, and the structure and function of the clasper 421 are similar to those of the clasper 221 of the first embodiment. When the first end 436 is depressed, the button 430 bends the elastic board 413 in order to separate the clasper 421 from the second protrusion 414. Therefore, the case 420 may detach from the body 410.

Furthermore, the button 430 includes two blocks 432 disposed below the second end 438. When being depressed, the first end 436 activates the blocks 432 to push the case 420 out. Therefore, the case 420 detaches from the body 410.

The mouse 400 further includes an elastic element 418. A part of the elastic element 418 extends to the first space 412. When the receiver 440 is received in the first space 412, the elastic element 418 touches the receiver 440 and provides an elastic force on the receiver 440 to stabilize the receiver 440 in the first space 412.

As FIG. 4B shows, one end 444 of the receiver 440 has a cambered surface which matches the corresponding camber surface of the case 420. When the receiver 440 is received in the first space 412, the end 444 of the receiver 440 completely covers the gap 426 so that the end 444 and the case 420 together form a smooth surface.

The body 410 also includes a second space 415a and a third space 415b, disposed at two sides of the first space 412 respectively, for receiving batteries.

Figure 5:
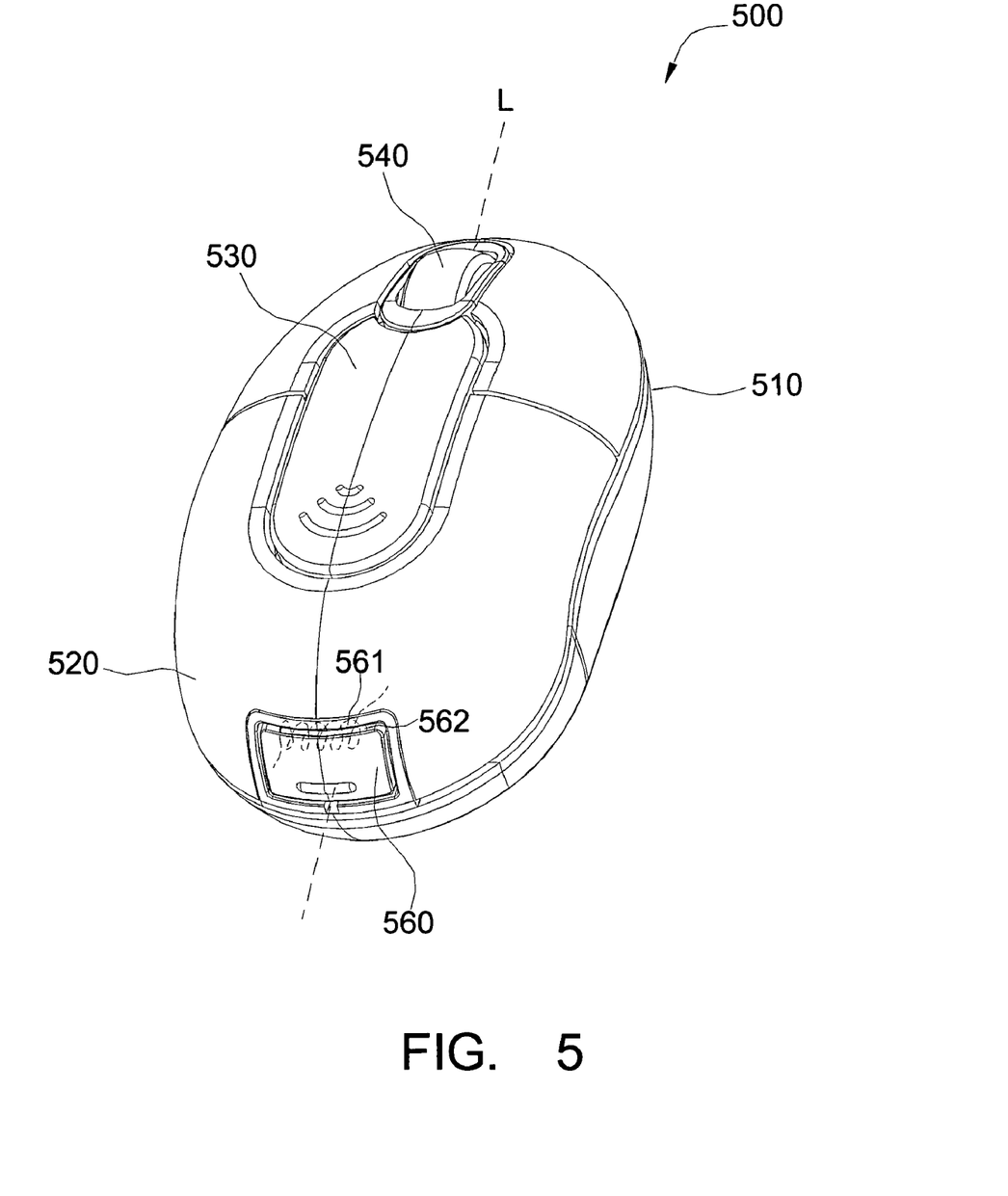
FIG. 5 illustrates a fourth embodiment of the present invention.

FIG. 5 shows a fourth embodiment of the wireless input device. The fourth embodiment is a wireless mouse 500. Compared to the mouse 400, the mouse 500 includes a cover 560 for covering the aforementioned opening and gap in FIG. 4A. A spring 561 and a hinge 562 are used to connect the cover 560 and the body 510. Because of the spring 561 and the hinge 562, the cover 560 would return automatically to cover the opening and the gap after being opened.

The mouse 500 includes a roller 540 for scrolling displays shown on a monitor. The roller 540 is disposed at the front end of the mouse 500 for a user to facilitate scrolling by a finger. The button 530 is disposed between the case 520 and the roller 540. The roller 540 and the button 530 are arranged along a longitudinal line L of the mouse 500.

The above descriptions of the embodiments are expected to clearly expound the characteristics of the present invention but not expected to restrict the scope of the present invention. For example, although only mice are exemplified herein, the spirit of the present invention can extend to any computer peripherals, such as keyboards, touch pads, and joy sticks. Those skilled in the art will readily observe that numerous modifications and alterations may be made while retaining the teaching of the invention. Accordingly, the above disclosure should be construed as limited only by the bounds of the claims.

The invention claimed is:

1. A wireless input device, comprising:
   a body having a first space for receiving an electronic device;
   a first structure for separably connecting the body and the electronic device,
      wherein the first space is formed by a tube, the tube has an opening;
   a case separably covering on the body, the case having a gap corresponding to the opening, the electronic device being capable of being removed through the opening and the gap; and
   a button connected to the body;
      wherein when being depressed, the button activates the first structure to separate the body and the electronic device so that the electronic device is capable of being removed from the first space.

2. The wireless input device of claim 1, wherein the first structure comprises:
   a pit disposed on the electronic device; and
   a first protrusion corresponding to the pit;
      wherein the first protrusion is lodged in the pit when the electronic device is received in the first space.

3. The wireless input device of claim 2, wherein the first structure further comprises an elastic piece disposed on the body and connected to the first protrusion, and when the button is depressed, the elastic piece is pushed so that the first protrusion separates from the pit.

4. The wireless input device of claim 3, wherein the elastic piece comprises a pillar, and when the button is depressed, the pillar is pushed so that the first protrusion separates from the pit.

5. The wireless input device of claim 1, further comprising a cover for covering the opening.

6. The wireless input device of claim 1, further comprising a cover for covering the opening and the gap.

7. The wireless input device of claim 1, further comprising a second structure for separably connecting the body and the case.

8. The wireless input device of claim 7, the second structure comprising:
   an elastic board connected to the body;
   a second protrusion disposed on the elastic board;
   a clasper, disposed on the case, for connecting to the second protrusion; and
      wherein when being depressed, the button pushes the elastic board to separate the clasper and the second protrusion so that the case detaches from the body.

9. The wireless input device of claim 8, wherein the button comprises a first end and a second end, the button activates the second structure when the first end is depressed, and, the button activates the first structure when the second end is depressed.

10. The wireless input device of claim 9, wherein the button further comprises a block disposed below the second end, and the block pushes the case out when the first end is depressed.

11. The wireless input device of claim 1, wherein the body further comprises a second space, disposed at one side of the first space, for receiving a first battery.

12. The wireless input device of claim 11, further comprising a case covering the body and the second space.

13. The wireless input device of claim 11, wherein the body further comprises a third space for receiving a second battery, and third space is disposed at an other side of the first space.

14. The wireless input device of claim 13, wherein the first space, the second space and the third space are parallel to a longitudinal line of the wireless input device.

15. The wireless input device of claim 1, wherein the case substantially has a U-shape.

16. The wireless input device of claim 1, the body further comprising an elastic element for providing an elastic force on the electronic device.

17. The wireless input device of claim 1, wherein when the electronic device is received in the first space, an end of the electronic device covers the gap so that the end of the electronic device and the case together form a smooth surface.

18. The wireless input device of claim 1, wherein the wireless input device is a mouse.

19. The wireless input device of claim 18, wherein the electronic device comprises a receiver selectively connected to a computer for receiving signals from the mouse.

20. The wireless input device of claim 18, wherein the electronic device comprises a data storage device.

21. The wireless input device of claim 20, wherein the electronic device further comprises a receiver selectively connected to a computer for receiving signals from the mouse.

* * * * *